(12) United States Patent
Cooley et al.

(10) Patent No.: US 9,076,171 B2
(45) Date of Patent: *Jul. 7, 2015

(54) AUTOMATIC ELECTRONIC PAYMENTS VIA MOBILE COMMUNICATION DEVICE WITH IMAGING SYSTEM

(75) Inventors: Shaun Cooley, El Segundo, CA (US); Charles Andrew Payne, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 340 days.

This patent is subject to a terminal disclaimer.

(21) Appl. No.: 12/969,471

(22) Filed: Dec. 15, 2010

(65) Prior Publication Data

US 2012/0158581 A1 Jun. 21, 2012

(51) Int. Cl.
G06Q 40/00 (2012.01)
G06Q 30/06 (2012.01)
G06Q 20/32 (2012.01)
G06Q 20/10 (2012.01)

(52) U.S. Cl.
CPC ............ *G06Q 30/06* (2013.01); *G06Q 20/3223* (2013.01); *G06Q 20/102* (2013.01); *G06Q 20/3274* (2013.01); *G06Q 20/3276* (2013.01)

(58) Field of Classification Search
USPC ............................. 705/35, 16, 41, 64, 26, 40
See application file for complete search history.

(56) References Cited

U.S. PATENT DOCUMENTS

| | | | |
|---|---|---|---|
| 8,177,125 B1 | 5/2012 | Cooley et al. | |
| 8,181,234 B2 | 5/2012 | Ishida | |
| 2006/0200854 A1 | 9/2006 | Saito | |
| 2008/0319905 A1 * | 12/2008 | Carlson | 705/44 |
| 2009/0228701 A1 | 9/2009 | Lin | |
| 2010/0023412 A1 | 1/2010 | Kitagawa et al. | |
| 2010/0274859 A1 | 10/2010 | Bucuk | |
| 2010/0275010 A1 | 10/2010 | Ghirardi | |
| 2010/0280957 A1 * | 11/2010 | Gullberg | 705/72 |
| 2011/0208659 A1 * | 8/2011 | Easterly et al. | 705/79 |
| 2011/0219427 A1 * | 9/2011 | Hito et al. | 726/3 |
| 2011/0307318 A1 | 12/2011 | LaPorte et al. | |
| 2011/0313870 A1 | 12/2011 | Eicher et al. | |
| 2012/0012649 A1 | 1/2012 | Hsu | |
| 2012/0159591 A1 | 6/2012 | Payne et al. | |

OTHER PUBLICATIONS

Official Action received from USPTO dated Jul. 31, 2012 for U.S. Appl. No. 12/969,303, filed Dec. 15, 2010.
Notice of Allowance received from USPTO dated Mar. 28, 2012 for U.S. Appl. No. 12/969,510, filed Dec. 15, 2010.
Notice of Allowance received from USPTO dated Jun. 24, 2014 for U.S. Appl. No. 12/969,303, filed Dec. 15, 2010.
PCT International Search Report and Written Opinion for Counterpart Application PCT/US 11/65300 dated Apr. 5, 2013, 8 pages.

* cited by examiner

*Primary Examiner* — Ojo Oyebisi
(74) *Attorney, Agent, or Firm* — Brill Law Office; Jeffrey Brill

(57) ABSTRACT

A graphical payment identifier is used to facilitate the automatic processing of an electronic payment. A graphical identifier payment system receives a request from a payment processing entity for a onetime use graphical payment identifier. In response, a onetime use graphical payment identifier to be displayed by the payment processing entity is generated. A request for user payment information by the payment processing entity is encoded in the graphical payment identifier, which is transmitted to the payment processing entity for display. The graphical payment identifier being displayed by the payment processing entity is captured by a registered user operated computing device. In response, the requested user payment information is transmitted to the payment processing entity, such that the electronic payment is executed automatically, without the user manually entering the requested payment information or providing a credit card.

20 Claims, 10 Drawing Sheets

AUTOMATIC ELECTRONIC PAYMENTS VIA MOBILE COMMUNICATION DEVICE WITH IMAGING SYSTEM

TECHNICAL FIELD

This disclosure pertains generally to computer security, and more specifically to using graphical identifiers for making automatic electronic payments.

BACKGROUND

Cash is disappearing from our daily lives as a means of payment. Carrying enough cash for all purchases is tedious, and leaves individuals at risk for theft. It is becoming common to use credit cards for almost all purchases, both online and off. Paying with credit cards solves the above-mentioned problems with cash, but introduces its own set of challenges such as identify verification, stolen credit cards, stolen credit card numbers and cloned cards. Debit cards resolve some of these issues with credit cards, because the customer enters a PIN to verify his or her identity. Thus, a stolen debit card is useless without the PIN. However, thieves are able to create fake ATMs and attach devices to real ATMs that allow the cloning of debit cards and access to the PINs. Various contactless payment systems have been created that attempt to provide electronic payments, such as Visa payWave and Mastercard PayPass. These systems make it extremely difficult for thieves to clone a card, but the other above-discussed problems with credit cards are still present.

It would be desirable to address these issues concerning credit cards payments.

On a related note, individuals often exchange money for various reasons. For example, one friend might borrow money from another and then pay it back. An individual might buy an item from a private party after finding it, for example, on Craigslist. One relative may give a cash gift to another. Carrying and exchanging cash for these transactions is problematic for the reasons described above. Paying individuals with credit cards is difficult, as most individuals do not have a merchant account. Paying an individual through PayPal is a good solution where the payee is set up to receives payments this way, but not all individuals are. Furthermore, PayPal precludes making anonymous payments, as the payer must know the email address of the person being paid.

It would be desirable to address these issues concerning payments between individuals as well.

SUMMARY

A graphical identifier payment system uses a graphical payment identifier to facilitate the automatic processing of an electronic payment from a user to a receiving party. The graphical identifier payment system receives a request from a payment processing entity for a onetime use graphical payment identifier. In some embodiments, the request from the payment processing entity identifies the specific payment information being requested by the payment processing entity. In some embodiments, the payment processing entity is a point of sale system. In other embodiments, the payment processing entity is a credit card terminal. In response to the received request, a onetime use graphical payment identifier to be displayed by the payment processing entity is generated. A request for payment information by the payment processing entity is encoded in the graphical payment identifier. In some embodiments, this further comprises encoding an identification of the specific payment information being requested by the payment processing entity in the graphical payment identifier. In any case, the generated graphical payment identifier is transmitted to the payment processing entity for display (e.g., on a payment screen).

The onetime use graphical payment identifier being displayed by the payment processing entity is captured by a registered user operated computing device (e.g., a mobile communication device). In response, the requested payment information is transmitted to the payment processing entity, such that the electronic payment from the user to the receiving party is executed automatically, without the user manually entering the requested payment information and without the user providing a physical credit card. More specifically, the graphical identifier payment system receives a request from the user operated computing device to automatically process the electronic payment, responsive to the user operated computing device having captured the onetime use graphical payment identifier being displayed by the payment processing entity. In some embodiments, the request received from the user operated computing device includes the specific payment information requested by the payment processing entity. In other embodiments, the request specifies what payment information is being requested by the payment processing entity, without including the payment information itself.

In some embodiments, a graphical payment identifier is used to facilitate the automatic processing of an electronic payment from a paying user operating a first mobile device to a payment receiving user operating a second mobile device. In these embodiments, the graphical identifier payment system receives a request for a onetime use graphical payment identifier from the paying user's mobile device. In response, a graphical payment identifier encoding an offer to make a payment from the paying user to the payment receiving user is transmitted to and displayed by the paying user's mobile device. The displayed graphical payment identifier is captured by the payment receiving user's mobile device. In response, the payment receiving user's mobile device transmits a request to the graphical identifier payment system to initiate the processing of the electronic payment. The graphical identifier payment system transmits a request to a payment processing entity to automatically process the electronic payment, such that the electronic payment from the paying user to the payment receiving user is executed automatically, without the paying user providing a physical credit card, and without requiring the payment receiving user to accept a credit card payment. The request to the payment processing entity can include real payment information concerning both the paying user and the payment receiving user. The graphical identifier payment system can receive a confirmation from the payment processing entity that the payment has been processed, and transmit confirmations to both mobile devices for display to the users.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
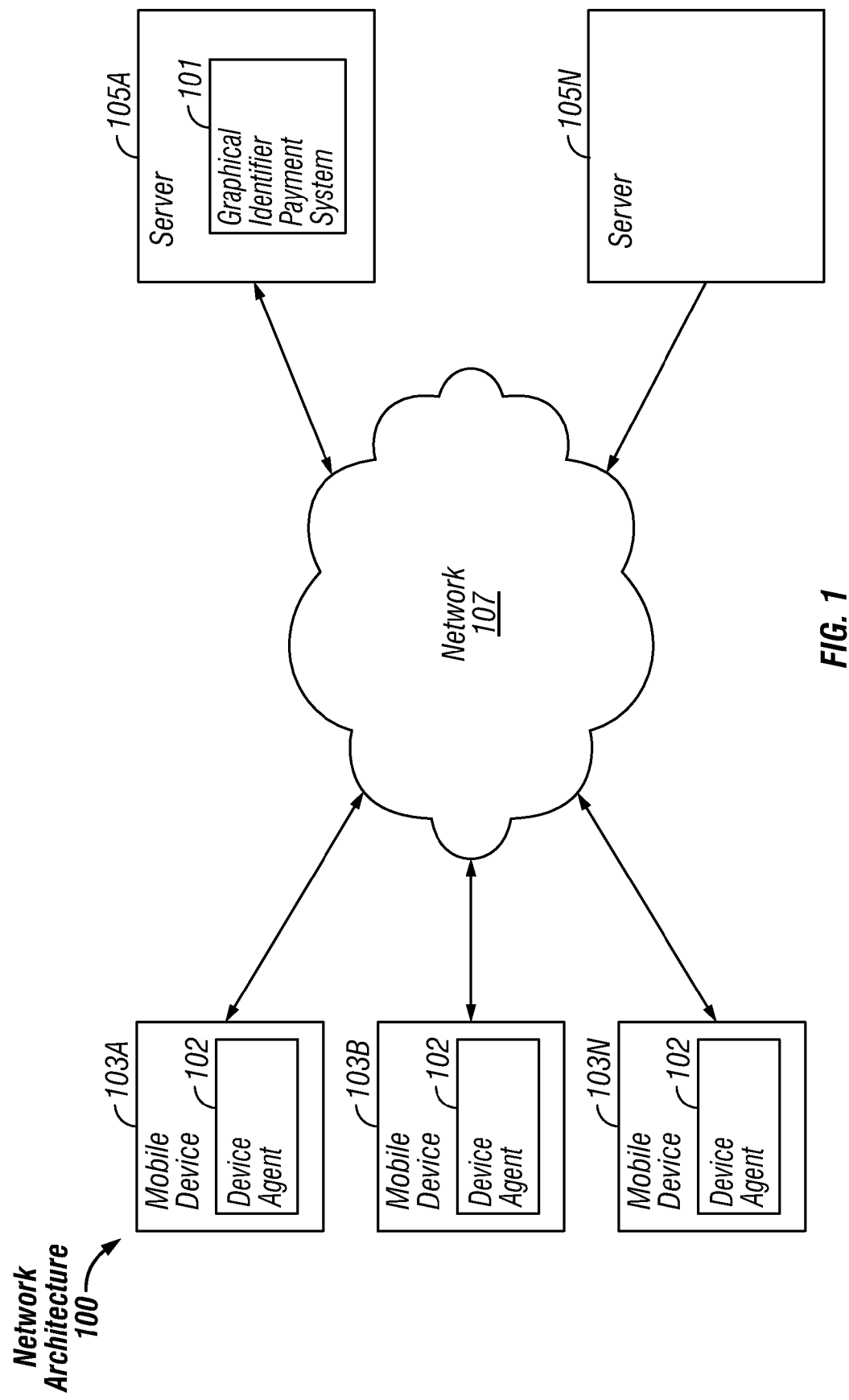
FIG. 1 is a block diagram of an exemplary network architecture in which a graphical identifier payment system can be implemented, according to some embodiments.

FIG. 1 is a block diagram illustrating an exemplary network architecture 100 in which a graphical identifier payment system 101 can be implemented. The illustrated network architecture 100 comprises multiple mobile communication devices 103A, 103B and 103N, as well as multiple servers 105A and 105N. In FIG. 1, the graphical identifier payment system 101 is illustrated as residing on server 105A, with a device agent 102 thereof on each mobile communication device 103. It is to be understood that this is an example only, and in various embodiments various functionalities of this system 101 can be instantiated on a mobile communication device 103, a server 105 or can be distributed between multiple computing devices as desired.

It is to be understood that the mobile communication devices 103 described herein comprises portable computer systems 210 capable of connecting to a network 107 and running applications (such mobile communication devices 103 are sometimes referred to as smart-phones, but even many mobile phones not so designated have these capabilities). Mobile communication devices 103 and servers 105 can be implemented using computer systems 210 such as the one illustrated in FIG. 2 and described below. The mobile communication devices 103 and servers 105 are communicatively coupled to a network 107, for example via a network interface 248 as described below in conjunction with FIG. 2. Mobile communication devices 103 are able to access applicants and/or data on servers 105 using, for example, a web browser or other client software (not shown).

Although FIG. 1 illustrates three mobile communication devices 103 and two servers 105 as an example, in practice many more (or fewer) mobile communication devices 103 and/or servers 105 can be deployed. In one embodiment, the network 107 is in the form of the internet. Other networks 107 or network-based environments can be used in other embodiments.

Figure 2:
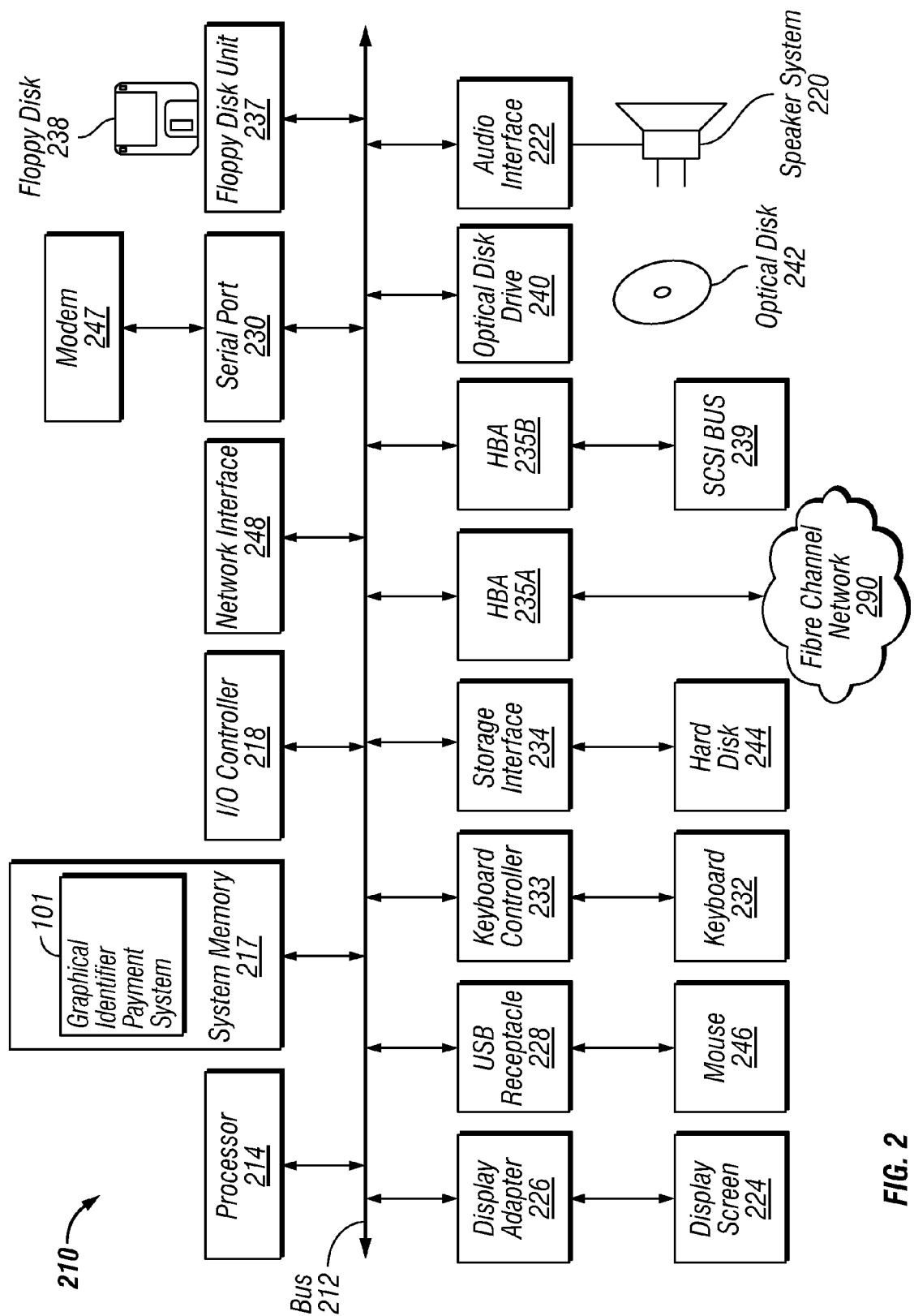
FIG. 2 is a block diagram of a computer system suitable for implementing a graphical identifier payment system, according to some embodiments.

FIG. 2 is a block diagram of a computer system 210 suitable for implementing a graphical identifier payment system 101. Both mobile communication devices 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the graphical identifier payment system 101 is illustrated as residing in system memory 217. The workings of the graphical identifier payment system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
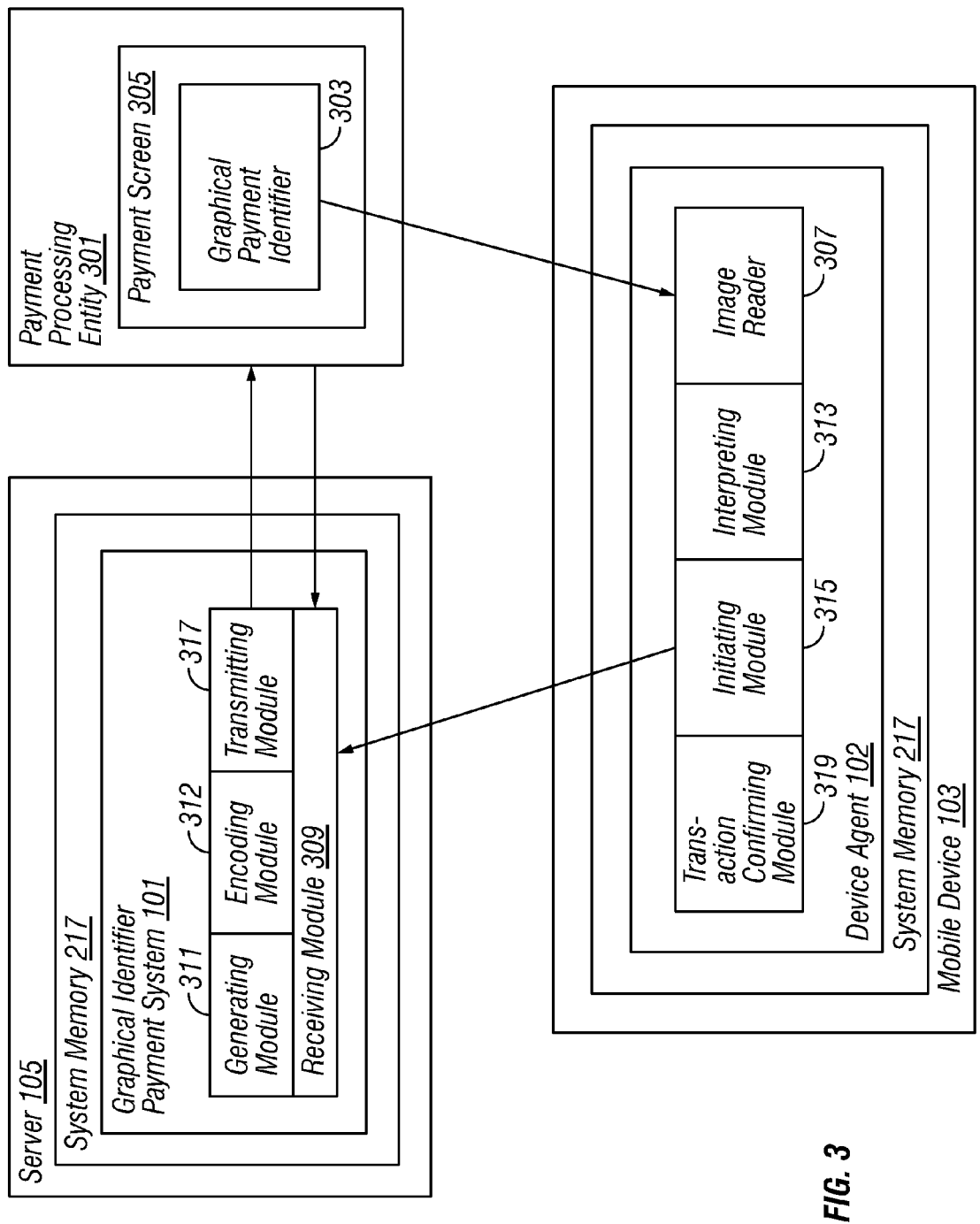
FIG. 3 is a block diagram of the operation of a graphical identifier payment system, according to some embodiments.

FIG. 3 illustrates the operation of a device agent 102 residing in the system memory 217 of a mobile communication device 103 and a graphical identifier payment system 101 residing in the system memory 217 of a server computer 105, according to some embodiments. As described above, the functionalities of the device agent 102 and the graphical identifier payment system 101 can reside on a mobile communication device 103, a server 105, or be distributed between multiple computer systems 210, including within a cloud-based computing environment in which the functionality in question is provided as a service over a network 107. It is to be understood that although the device agent 102 and the graphical identifier payment system 101 are illustrated in FIG. 3 as single entities, these components represent collections of functionalities, which can be instantiated as a single or multiple modules as desired (an instantiation of specific, multiple modules of the device agent 102 and the graphical identifier payment system 101 are illustrated in FIG. 3). It is to be understood that the modules of the device agent 102 and of the graphical identifier payment system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" "mobile communication device" and "computing device" mean one or more computers configured and/or programmed to execute the described functionality. Additionally, program code to implement the functionalities of the graphical identifier payment system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the graphical identifier payment system 101 enables an automatic payment procedure that frees users from having to use cash, carry or swipe a credit card or manually enter payment information each time they make a payment. Instead, a user completes an electronic payment process via the use of a special graphical payment identifier 303 that is displayed by a payment processing entity (e.g., on a payment screen 305 or statement). As explained in greater detail below, the graphical payment identifier 303 is captured by an image reader 307 (e.g., digital camera, digital barcode reader, etc.) on a user's personal mobile communication device 103 (e.g., smart-phone, tablet computing device, etc.). Once the graphical payment identifier 303 is captured, the device agent 102 running on the mobile communication device 103 interprets the graphical payment identifier 303 as a request from the payment processing entity 301 for payment information. The device agent 102 on the mobile communication device 103 then directs the graphical identifier payment system 101 to automatically process the payment through back channels, as described in more detail below.

In FIG. 3 the graphical identifier payment system 101 is illustrated as residing on a server 105 which is separate from any payment processing entity 301 through which payments are made via a graphical payment identifier 303, and separate from any vendor that receives such payments. In other embodiments, some or all of the functionality of the graphical identifier payment system 101 can be provided directly by a computer 210 hosting a payment processing entity 301 and/or a target vendor. However, in embodiments in which the graphical identifier payment system 101 runs on a separate server 105 as illustrated in FIG. 3, it can be used in conjunction with multiple payment processing entities 301. The graphical identifier payment system 101 brokers trust between mobile communication devices 103 and payment processing entities 301, in order to processes payments for users.

Each user that wishes to use the graphical payment functionality described herein obtains a mobile communication device 103 running a device agent 102. Such a user registers with the graphical identifier payment system 101. To register the user, the graphical identifier payment system 101 authenticates the user and identifies the user's mobile communication device 103. The graphical identifier payment system 101 can use any conventional authentication method to authenticate the user (username and password, identification check, bank transfer, credit card authentication, etc.). To identify the specific mobile communication device 103 being operated by the authenticated user, the graphical identifier payment system 101 can, for example, read unique identifying information such as a serial number from the installed device agent 102 or the mobile communication device 103 itself. A registered user can provide payment information such as real payment methods (e.g., credit card information, bank account information and/or PayPal account information, etc.) to the graphical identifier payment system 101. The graphical identifier payment system 101 stores an association between that user, the specific mobile communication device 103, and, where provided, the user's payment information, so that the graphical identifier payment system 101 can later recognize the registered user and mobile communication device 103, and use the associated payment information to process payments.

A graphical payment identifier generating module 311 of the graphical identifier payment system 101 generates one-time use graphical payment identifiers 303 for use by payment processing entities 301. In this context a graphical payment identifier comprises an indication of a request for payment information from a specific payment processing entity 301. A graphical payment identifier 303 can be output as a visible image that can be captured and interpreted by a mobile communication device 103 running a device agent 102. In one embodiment, graphical payment identifiers 303 comprise renderable QR Codes that can be embedded on web pages. In addition to QR Codes, simple barcodes, 2d barcodes (3-DI, ArrayTag, Aztec Code, Codablock, Code 1, Code 16K, Code 49, ColorCode, CP Code, DataGlyphs, Data Matrix, Datastrip, Dot Code A, HCCB (Microsoft Tag), hueCode, Intacta.Code, MaxiCode, MiniCode, PDF 417, Snowflake code, SuperCode, Ultracode) and/or other computer identifiable data encoding mechanisms can be used in other embodiments. The amount of information encoded in graphical payment identifiers 303 can vary between payment processing entities 301 and embodiments. A graphical payment identifier 303 can encode the identification of the payment processing entity 301 to which it is issued, and an indication of what specific payment information the payment processing entity is requesting. In other instances, a graphical payment identifier 303 identifies the payment processing entity 301, but the graphical identifier payment system 101 and/or device agents 102 track what payment information is requested by which payment processing entity 301. In any case, a graphical payment identifier encoding module 312 encodes information in a graphical payment identifier 303 such that it can be interpreted by a device agent 102, as described below.

When a payment processing entity 301 that supports graphical payment identifiers 303 wishes to accept a payment from a user (for example, at load time of a page containing a payment screen 305), the payment processing entity 301 issues a request to the graphical identifier payment system 101 for a graphical payment identifier 303. A receiving module 307 of the graphical identifier payment system 101 on the server receives the request. In response to the received request, the graphical payment identifier generating module 311 generates a onetime use graphical payment identifier 303 for the payment processing entity 301. In some instances, the request identifies the specific requested payment information to encode in the graphical payment identifier 303. In other instances, the graphical identifier payment system 101 stores this information per payment processing entity 301, and encodes it in the generated graphical payment identifier 303. In yet other instances, this information is not encoded in the graphical payment identifier 303, as noted above. In any case, a transmitting module 317 of the graphical identifier payment system 101 transmits the generated graphical payment identifier 303 to the requesting payment processing entity 301. Additionally, in some embodiments the payment processing entity 301 provides additional statement details to the graphical identifier payment system 101 concerning the current transaction (e.g., a description, line items, their prices, a total price, etc.). This information can be used to confirm the transaction with the user, as described below.

Figure 4:
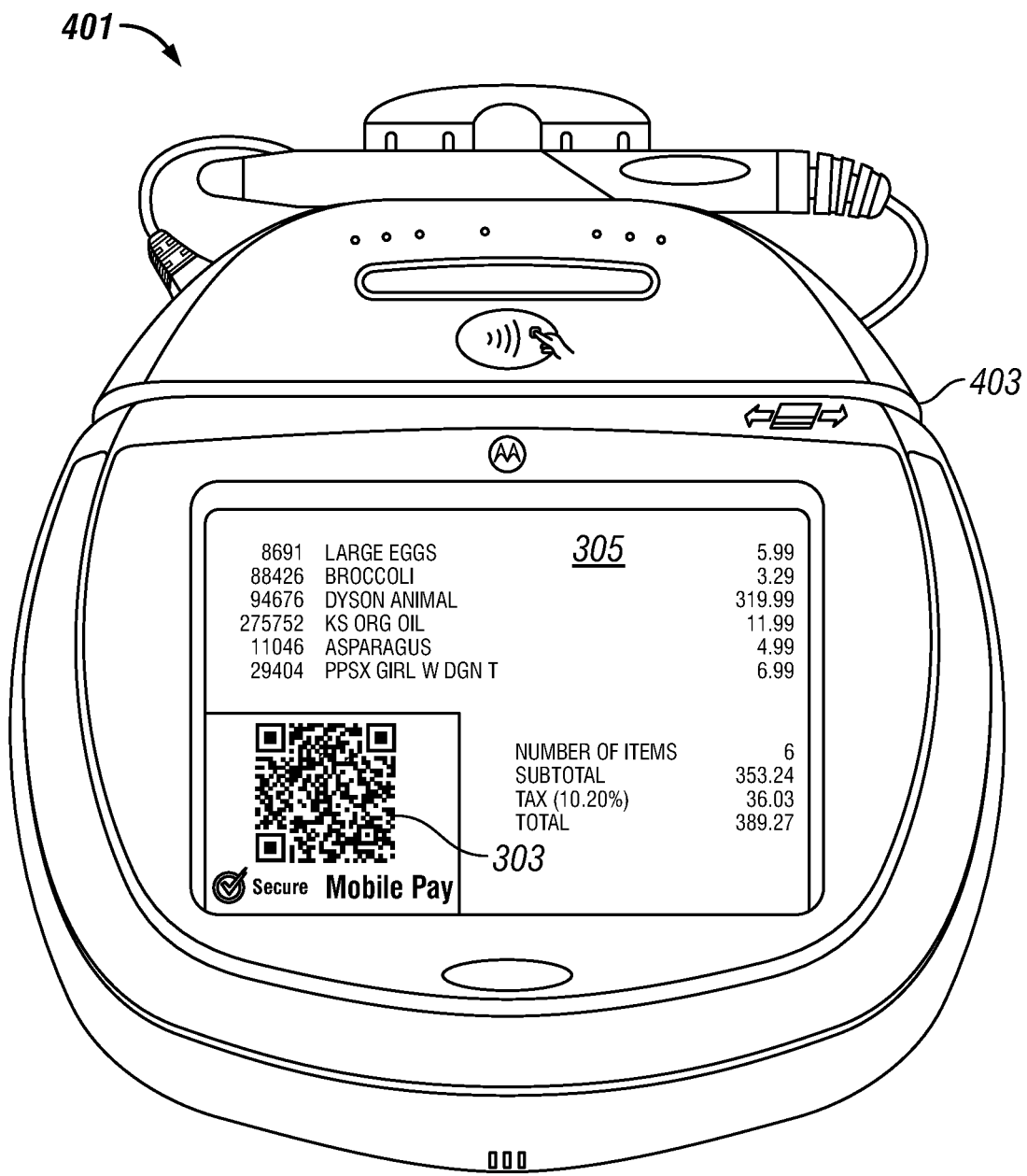
FIG. 4 is a diagram of a point of sale system displaying a graphical payment identifier, according to some embodiments.

The payment processing entity 301 receives the graphical payment identifier 303, and processes it so as to display the resulting image, for example on a payment screen 305. In some embodiments, the only request for payment displayed by the payment processing entity 301 is the graphical payment identifier 303 itself. In other embodiments the graphical payment identifier 303 is displayed in addition to a conventional prompt for at least some payment information. For example, users can be given an option to make a payment by conventionally entering payment information (e.g., by swiping a credit card) or by using the graphical payment identifier 303. In some embodiments, the payment processing entity 301 displays the graphical payment identifier 303 not on a screen but instead on a physical medium such as a printed statement. FIG. 4 illustrates a payment screen 305 of a point of sale device 401 displaying a graphical payment identifier 303, along with a conventional mechanism 403 for swiping credit cards, according to some embodiments.

Figure 5:
FIG. 5 is a diagram of a mobile communication device capturing a displayed graphical payment identifier, according to some embodiments.

When a user views a payment processing entity's payment screen 305 (or other output mechanism) containing a graphical payment identifier 303, the user can make a payment automatically by using a registered mobile communication device 103. In some embodiments, the device agent 102 prompts the user to identify himself, in order to prevent unauthorized parties from using stolen mobile devices 103. This user identification can comprise entry of a four digit personal identification number (PIN), or another conventional authentication method such as a fingerprint scan, facial geometry recognition or other biometric authentication, depending on the capabilities of the mobile device 103. Once the user is identified at the mobile device level 103, the user points the image reader 307 of the mobile communication device 103 at the graphical payment identifier 303 being displayed by the payment processing entity 301, and activates the image reader 307 (e.g., takes a digital photograph of or scans the graphical payment identifier 303). The image reader 307 captures the graphical payment identifier 303, and a graphical identifier interpreting module 313 of the device agent interprets the information encoded therein as a request by the payment processing entity 301 for payment information. FIG. 5 shows a mobile communication device 103 capturing a graphical payment identifier 303 according to some embodiments.

The graphical identifier interpreting module 313 interprets the information encoded in the graphical payment identifier 303, which, as explained above, typically identifies the payment processing entity 301 that is requesting payment information and in some cases the specific payment information being requested.

Figure 6:
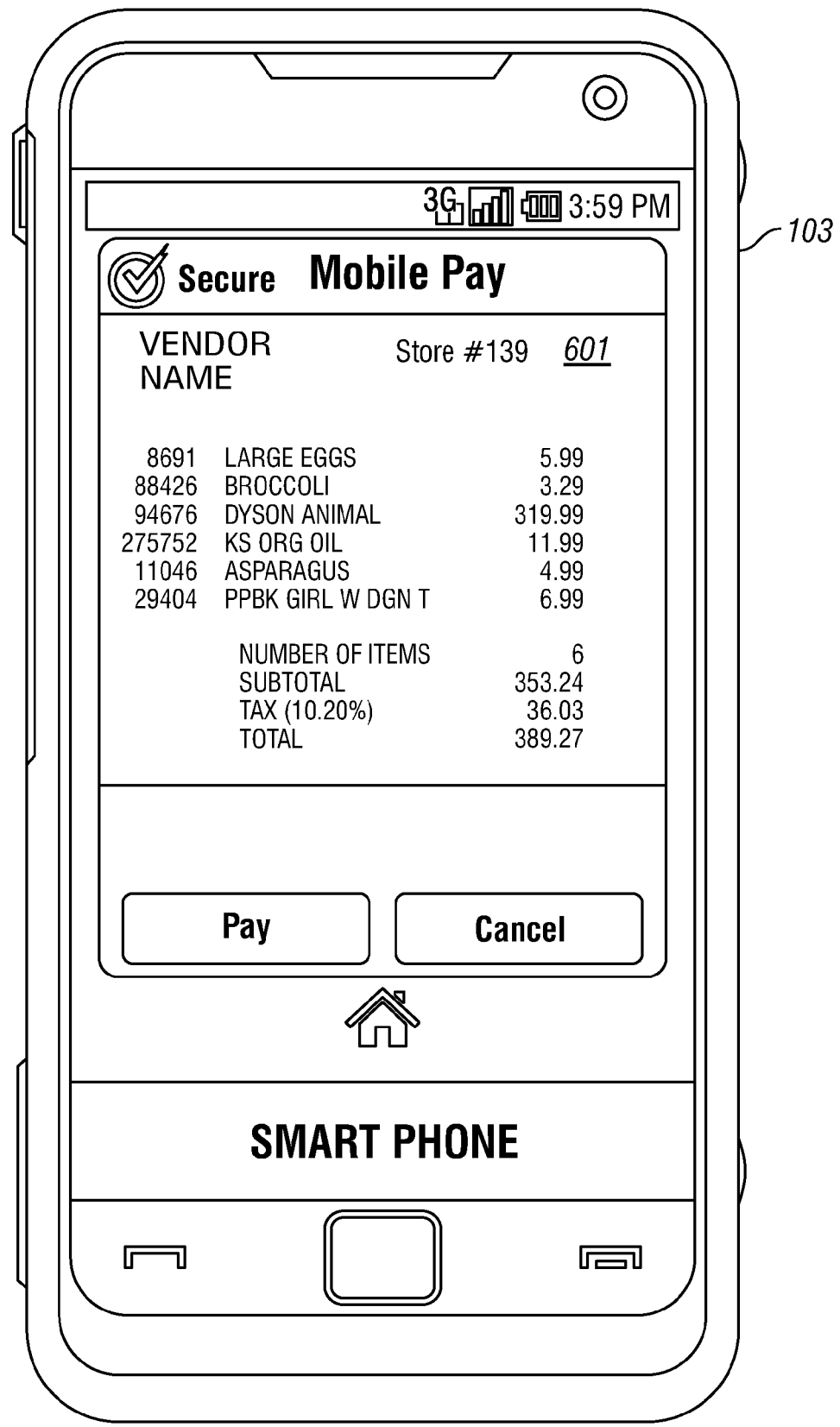
FIG. 6 is a diagram of a mobile communication device displaying a transaction confirmation, according to some embodiments.

In some embodiments, a transaction confirming module 319 of the device agent 102 displays a transaction confirmation to the user. The transaction confirmation can display as much or as little information as desired (e.g., the name of the vendor being paid and the transaction total, the complete statement with the individual line items, etc.). As noted above, this type of transaction information can be provided from the payment processing entity 301 to the graphical identifier payment system 101, and in turn from the graphical identifier payment system 101 to the device agent 102. In some embodiments, the transaction confirming module 319 gives the user an option to confirm or cancel the transaction, and/or the option to select which stored payment method to use (e.g., from a drop down menu). FIG. 6 shows a mobile communication device 103 displaying a transaction confirmation 601 according to some embodiments.

Once the graphical payment identifier 303 has been interpreted (and after any optional transaction confirmation activity), an automatic payment initiating module 315 of the device agent 102 initiates the automatic payment from the user, by communicating with the graphical identifier payment system 101, requesting that the graphical identifier payment system 101 automatically process the payment from the user to the target party (e.g., vendor) through the payment processing entity 301.

The request from the mobile device 103 to automatically process the payment for the user is received by the receiving module 309 of the graphical identifier payment system 101 on the server 105. In order to automatically process the payment, the transmitting module 317 of the graphical identifier payment system 101 on the server 105 transmits the requested payment information to the payment processing entity 301, responsive to the mobile device 103 associated with the user capturing the graphical payment identifier 303. In some cases, the automatic payment initiating module 315 of the device agent 102 provides the requested payment information to the graphical identifier payment system 101 on the server 105. In some of these embodiments, the identification of what payment information the payment processing entity 301 is requesting is encoded in the graphical payment identifier 303 which, as described above, is interpreted at a mobile device 103 level. In other such embodiments, the mobile device 103 tracks which payment processing entity 301 requests what payment information. In other embodiments, the graphical identifier payment system 101 on the server 105 stores payment information for registered users, and need not receive the requested information from the mobile device, but instead only the request to process the payment. In any case, the transmitting module 317 automatically processes the payment for the user, by transmitting the requested payment information to the payment processing entity 301. This payment information can be transmitted to the payment processing entity 301 proactively in responsive to the mobile device 103 having captured the graphical payment identifier 303, or in response to a specific request from the payment processing entity 301 itself. Once the payment processing entity 301 has received the payment information, the payment processing entity 301 uses the payment information to execute the payment from the user to the receiving party. Note that by using a graphical payment identifier 303, the user is spared from having to use cash, carry or swipe a credit card, or manually enter the payment information.

It is to be understood that payment processing entities 301 execute payments to receiving parties electronically (e.g., via credit card, electronic funds transfer, PayPal, etc.). A payment processing entity 301 can comprise any entity configured to process the execution of a payment from a user to a receiving party electronically, and configured to display information to users on screen and/or by printing a statement. Examples of payment processing entities 301 are point of sale systems and credit card terminals. Examples of payment receiving parties are vendors, physical retail stores, wholesalers, webstores, etc. Some payment processing entities 301 can be associated with a single payment receiving party (e.g., a point of sale system at a store), whereas others can process payments to many different receiving parties (e.g., a credit card terminal). Note that processing the execution of an actual payment (e.g., transferring funds between financial institutions, actually executing a credit card transaction) is not the same thing as simply receiving payment information (e.g., a credit number and expiration date, a bank account number, etc.), by, e.g., a webstore, for subsequent processing by a third party.

Figure 7:
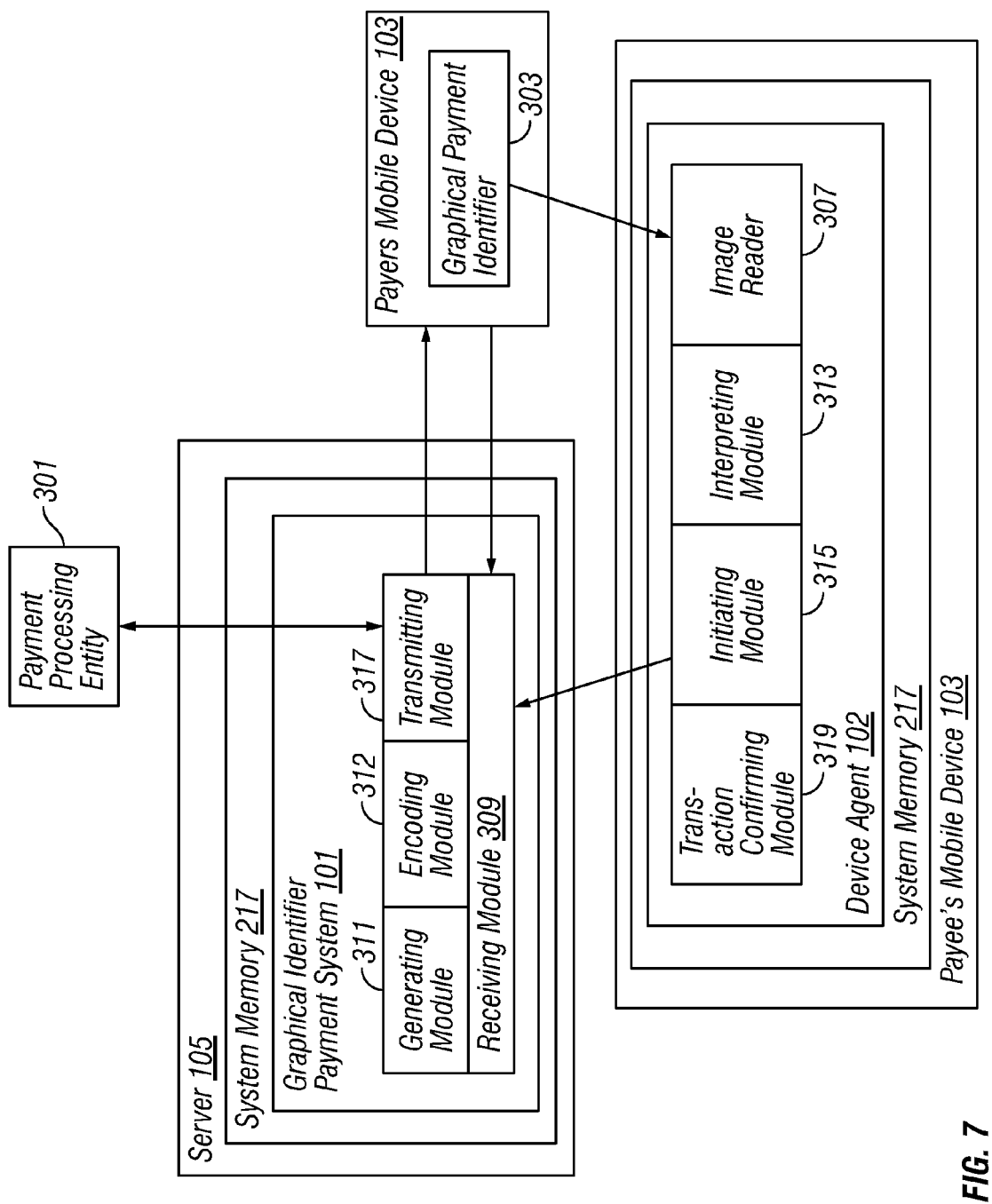
FIG. 7 is a block diagram of the operation of a graphical identifier payment system in which a paying mobile communication device makes a payment to a receiving mobile communication device, according to other embodiments.

FIG. 7 illustrates an embodiment in which an individual can use the graphical identifier payment system 101 to automatically make an electronic payment another individual, as opposed to making a payment to a commercial receiving party. In this case, the payer's mobile device 102 displays a graphical payment identifier 303 that can be captured by the payee's mobile device 102. Once the graphical payment identifier 303 is captured, the payee's mobile communication device 102 communicates with the graphical identifier payment system 101 on the server 105, which processes the payment through back channels. The payer and the payee both operate mobile communication devices 103 running device agents 102. Both users register with the graphical identifier payment system 101, as described above.

Figure 8:
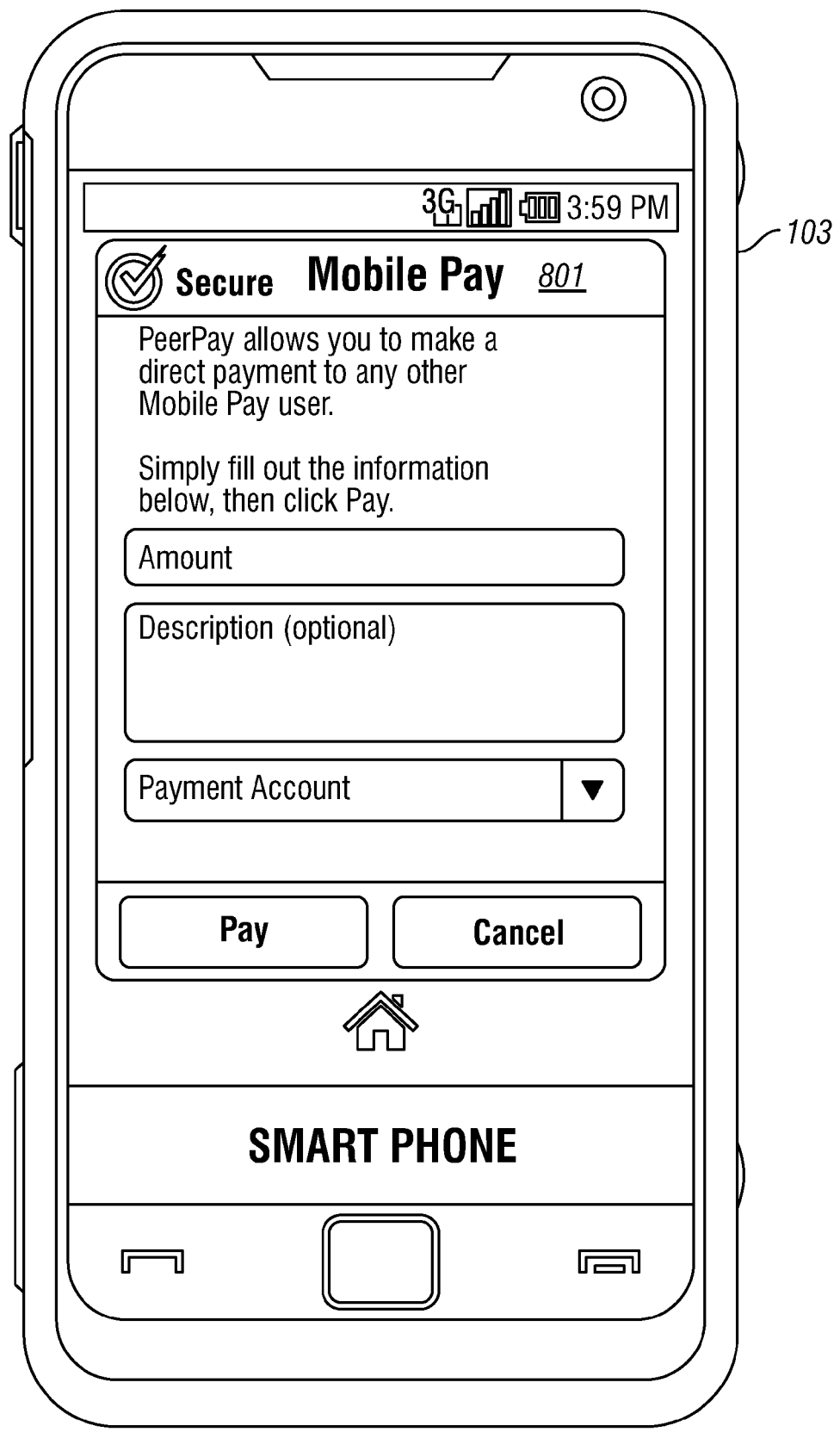
FIG. 8 is a diagram of a payer's mobile communication device displaying an entry screen for making a payment to another user, according to some embodiments.

When a user wishes to utilize a graphical payment identifier 303 to make a payment to another individual, the user operates his mobile device 103, and the device agent 102 prompts the user to enter the payment amount, select a true payment method (e.g., from a drop down menu) and optionally enter a transaction description. FIG. 8 illustrates a payer's mobile communication device 103 displaying an entry screen 801 for making a payment to another individual, according to one embodiment.

Once the user has entered this information, the device agent makes a request to the graphical identifier payment system 101 for a graphical payment identifier 303, as described above. In response, the graphical payment identifier generating module 311 generates a onetime use graphical payment identifiers 303 as described above, but in this scenario the graphical payment identifier 303 is to be used by the payer's mobile communication device 103, and comprises an indication of an offer to make a payment. In some instances, the graphical payment identifier generating functionality is instantiated on the server 105 as illustrated, but in other cases it is instantiated on the payer's mobile communication device 103, as a module of the device agent 102.

Figure 9:
FIG. 9 is a diagram of a payer's mobile communication device displaying a graphical payment identifier, according to some embodiments.

The graphical payment identifier 303 is output by the payer's mobile communication device 103 as a visible image that can be captured and interpreted by the payee's mobile communication device 103. The amount of information encoded in graphical payment identifiers 303 in this scenario can vary, but can include data such as the identification of the registered payer and/or payee, the amount of the payment, true payment information for one or both parties, and optionally additional descriptive information concerning the payment. FIG. 9 illustrates a payer's mobile communication device 103 displaying a graphical payment identifier 303, according to one embodiment.

The payee can accept the payment automatically, by pointing the image reader 307 of his mobile communication device 103 at the graphical payment identifier 303 being displayed by the payee's mobile communication device 103, and activating the image reader 307. The image reader 307 captures the graphical payment identifier 303, and the graphical identifier interpreting module 313 of the device agent 102 on the payee's mobile device 103 interprets the information encoded therein as an offer by the payer's mobile device 103 to make a payment. Once the graphical payment identifier 303 has been interpreted, an automatic payment initiating module 315 of the device agent 102 on the payee's mobile device 103 initiates the automatic payment, by communicating with the graphical identifier payment system 101, requesting that the graphical identifier payment system 101 automatically process the payment.

The request from the payee's mobile device 103 to automatically process the payment is received by the receiving module 309 of the graphical identifier payment system 101 on the server 105. In order to automatically process the payment, the transmitting module 317 of the graphical identifier payment system 101 on the server 105 transmits real payment information for both parties to an appropriate payment processing entity 301, responsive to the payee's mobile device 103 associated with the user capturing the graphical payment identifier 303. The graphical identifier payment system 101 electronically communicates with the payment processing entity 301 to execute the payment from the payer to the payee (e.g., by transferring funds between their respective bank accounts, or otherwise utilizing their respective real payment information). The real payment information for each party can be tracked by the graphical identifier payment system 101, provided by the appropriate mobile communication devices 103 and/or encoded in the graphical payment identifier 303.

Figure 10:
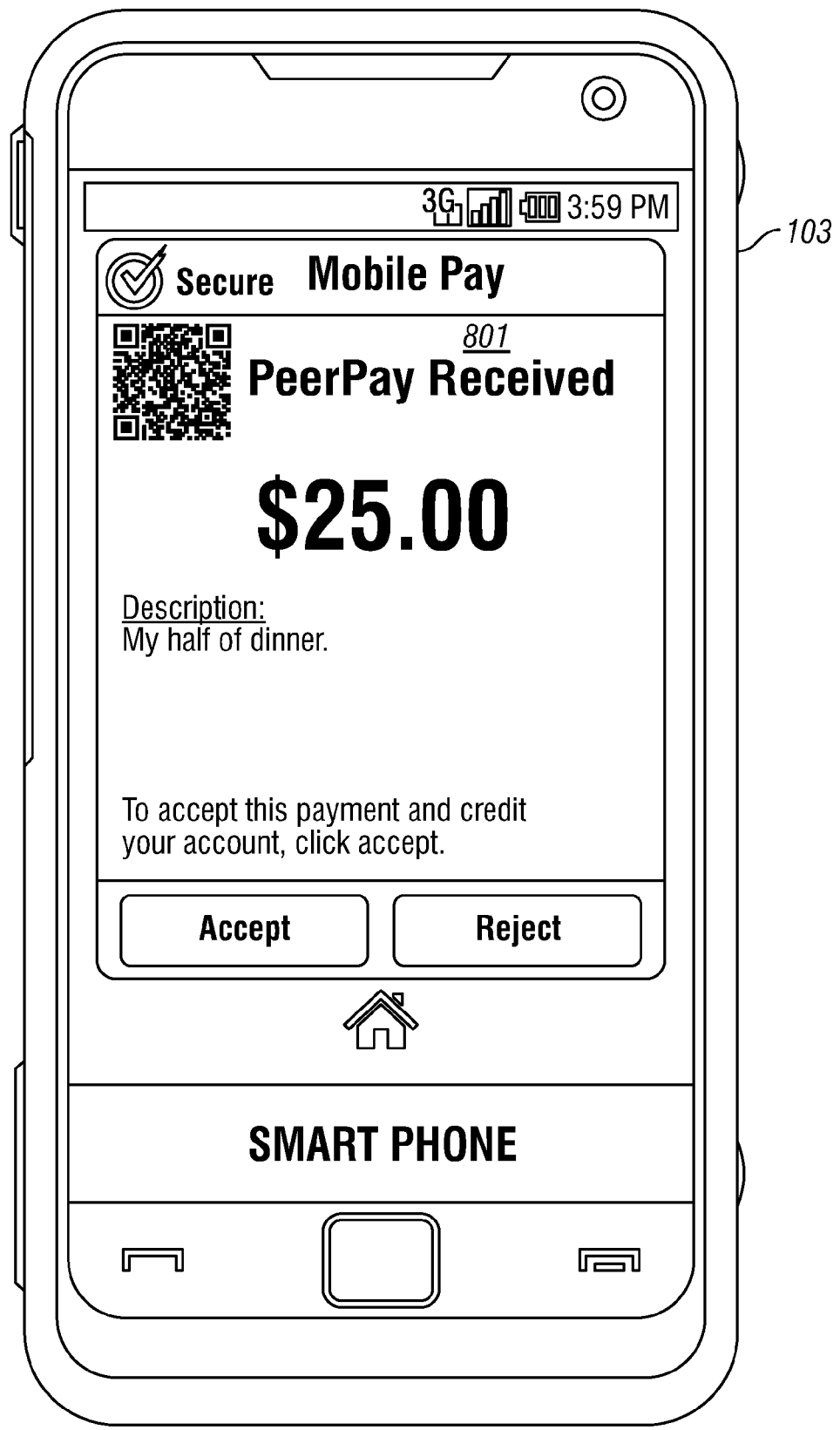
FIG. 10 is a diagram of a payee's mobile communication device displaying a transaction confirmation, according to some embodiments.

Once the payment has been processed, the receiving module 307 of the graphical identifier payment system 101 typically receives a confirmation from the payment processing entity 301, and in response the transmitting module 317 of the graphical identifier payment system 101 typically transmits confirmations to both mobile communication devices, which can display confirming information to the users. FIG. 10 illustrates the payee's mobile communication device 103 displaying a transaction confirmation 801, according to one embodiment. Note that by using a graphical payment identifier 303, one individual can make a payment to another without having to carry or exchange cash, carry or swipe a credit card, accept credit card payment and/or manually enter payment information.

The communication between mobile devices 103 and the graphical identifier payment system 101 on the server 105, as well as between the graphical identifier payment system 101 on the server 105 and the various payment processing entities 301 is typically encrypted for security. Additionally, because each graphical payment identifier 303 is only usable one time, the communication cannot be successfully replayed. The communication between a mobile device 103 and the graphical identifier payment system 101 on the server 105 can be conducted via SMS or other messaging services in instances where the mobile device 103 does not currently have access to the internet.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method in a payment server for using a graphical payment identifier to automatically process an electronic payment from a user to a receiving party, the method comprising the steps of:
   generating a onetime use graphical payment identifier to be displayed by a payment processing entity in order to collect an electronic payment from the user, including encoding a request for payment using electronic payment information from the user by the payment processing entity in the onetime use graphical payment identifier;
   sending the onetime use graphical payment identifier from the payment server to the payment processing entity for display to the user;
   receiving a capture of the onetime use graphical payment identifier being received at the payment sever from a registered user-operated computing device;
   responsive to interpretation of information coded in the capture of the onetime use graphical payment identifier as a request for payment information, transmitting the requested electronic payment information to the payment processing entity, such that the electronic payment from the user to the receiving party is executed automatically, without the user manually entering information and without the user providing a physical credit card.

2. The method of claim 1 further comprising:
   receiving a request for a onetime use graphical payment identifier from the payment processing entity, by the at least one computer; and
   transmitting the generated onetime use graphical payment identifier to the payment processing entity, by the at least one computer.

3. The method of claim 1 wherein encoding the request for payment information in the onetime use graphical payment identifier further comprises:
   encoding an identification of specific payment information being requested by the payment processing entity, by the at least one computer.

4. The method of claim 3 wherein:
   the received request for the onetime use graphical payment identifier further identifies the specific payment information being requested by the payment processing entity.

5. The method of claim 1 further comprising:
   receiving, by the at least one computer from the user operated computing device, a request to automatically process the electronic payment, responsive to the user operated computing device having captured the onetime use graphical payment identifier being displayed by the payment processing entity.

6. The method of claim 5 wherein:
   the request received by the at least one computer from the user operated computing device further comprises the payment information requested by the payment processing entity.

7. The method of claim 5 wherein:
   the request received by the at least one computer from the user operated computing device further identifies what specific payment information is being requested by the payment processing entity.

8. The method of claim 1 further comprising:
   receiving information from the payment processing entity concerning a transaction being conducted by the user, by the at least one computer; and
   transmitting the received information concerning the transaction being conducted by the user to the user operated computing device, by the at least one computer.

9. The method of claim 1 wherein:
   the user operated computing device further comprises a mobile communication device.

10. The method of claim 1 wherein:
    the payment processing entity further comprises a point of sale system.

11. The method of claim 1 wherein:
    the payment processing entity further comprises a credit card terminal.

12. A computer-implemented method for using a graphical payment identifier to automatically process an electronic payment from a paying user operating a first mobile device to a payment receiving user operating a second mobile device, the method comprising the steps of:
    generating a onetime use graphical onetime use payment identifier to be displayed by the first mobile device in order to collect an electronic payment from the user, including encoding an offer to make a payment from the paying user to the payment receiving user in the onetime use graphical payment identifier;
    displaying the onetime use graphical payment identifier from the first mobile device to the second mobile device;
    receiving a capture of the onetime use graphical payment identifier being received from the second mobile device; and
    responsive to interpretation of information coded in the capture of the onetime use graphical payment identifier as a request for payment information, transmitting a request to a payment processing entity to automatically process the electronic payment, such that the electronic payment from the paying user to the payment receiving user is executed automatically, without the paying user providing a physical credit card or manually entering information at the time of the payment request, and without requiring the payment receiving user to accept a credit card.

13. The method of claim 12 further comprising:
receiving a request for a onetime use graphical payment identifier from the first mobile device, by the at least one computer; and
transmitting the generated graphical payment identifier to the first mobile device, by the at least one computer.

14. The method of claim 12 further comprising:
receiving, by the at least one computer from the second mobile device, a request to automatically process the electronic payment, responsive to the second mobile device having captured the onetime use graphical payment identifier being displayed by the first mobile device.

15. The method of claim 12 wherein transmitting a request to a payment processing entity to automatically process the electronic payment further comprises:
transmitting real payment information concerning both the paying user and the payment receiving user to the payment processing entity, by the at least one computer.

16. The method of claim 12 further comprising:
responsive to receiving, by the at least one computer from the payment processing entity, a confirmation that the payment has been processed, transmitting confirmations that the payment has been processed to both the first mobile device and to the second mobile device.

17. A computer-implemented method for using a graphical payment identifier to automatically process an electronic payment from a paying party to a receiving party, the method comprising the steps of:
capturing, by a user operated computing device, a onetime use graphical payment identifier being displayed by a second computing device, the onetime use graphical payment identifier generated and encoded in order to collect an electronic payment from the paying party to the receiving party;
interpreting, by the user operated computing device, the onetime use graphical payment identifier as an indication to initiate automatic processing of the electronic payment; and
initiating, by the user operated computing device, processing of the electronic payment by transmitting the graphical payment identifier to a payment processing entity, such that responsive to interpretation of information coded in the capture of the onetime use graphical payment identifier as a request for payment information, the payment processing entity automatically processes the electronic payment, without the user providing a physical credit card or manually entering information at the time of the payment request.

18. The method of 17 further comprising:
displaying, by the user operated computing device, confirmation information concerning a transaction being conducted by a user.

19. The method of 18 further comprising:
receiving, by the user operated computing device, a confirmation from the user to complete the transaction being conducted by the user on the payment processing entity; and
responsive to receiving the confirmation from the user, initiating completion of automatic payment from the user, by the user operated computing device.

20. The method of 17 further comprising:
receiving, by the user operated computing device, a confirmation that the payment has been processed; and
displaying the received confirmation, by the user operated computing device.

* * * * *